US007010572B1

(12) United States Patent
Benjamin et al.

(10) Patent No.: US 7,010,572 B1
(45) Date of Patent: Mar. 7, 2006

(54) SYSTEM FOR HANDLING ELECTRONIC MAIL

(75) Inventors: Dennis Andrew Benjamin, Fitzroy (AU); Nicholas Alan Rodda, Fitzroy (AU)

(73) Assignee: A Pty Ltd., Fitzroy (AU)

( * ) Notice: Subject to any disclaimer, the term of this patent is extended or adjusted under 35 U.S.C. 154(b) by 0 days.

(21) Appl. No.: 09/486,648

(22) PCT Filed: Feb. 5, 1999

(86) PCT No.: PCT/AU99/00079

§ 371 (c)(1),
(2), (4) Date: May 10, 2001

(87) PCT Pub. No.: WO99/40527

PCT Pub. Date: Aug. 12, 1999

(30) Foreign Application Priority Data

Feb. 5, 1998 (AU) ..................................... PP1638
Sep. 16, 1998 (AU) ..................................... PP5947

(51) Int. Cl.
*G06F 13/00* (2006.01)

(52) U.S. Cl. ...................... 709/206; 709/203; 709/217; 709/219

(58) Field of Classification Search ................ 709/200, 709/201, 203, 217, 218, 219, 220, 223, 224, 709/227, 228, 229
See application file for complete search history.

(56) References Cited

U.S. PATENT DOCUMENTS 5,493,564 A 2/1996 Mullan
5,678,045 A 10/1997 Bettels
5,835,089 A * 11/1998 Skarbo et al.
5,987,508 A * 11/1999 Agraharam et al.
5,990,886 A * 11/1999 Serdy et al.
6,014,711 A * 1/2000 Brown
6,085,231 A * 7/2000 Agraharam et al.
6,101,320 A * 8/2000 Schuetze et al.
6,122,258 A * 9/2000 Brown
6,212,553 B1 * 4/2001 Lee et al.
6,249,805 B1 * 6/2001 Fleming, III
6,285,777 B1 * 9/2001 Kanevsky et al.
6,334,140 B1 * 12/2001 Kawamata
6,335,963 B1 * 1/2002 Bosco
6,374,246 B1 * 4/2002 Matsuo

FOREIGN PATENT DOCUMENTS

JP 08-097853 4/1996
JP 10-083362 3/1998

OTHER PUBLICATIONS

Derwent Abstract Accession No. 96-245101/25, published by Derwent Abstracts, regarding Japanese published application 08-097853, published Apr. 12, 1996.

(Continued)

*Primary Examiner*—Moustafa M. Meky
(74) *Attorney, Agent, or Firm*—Brinks Hofer Gilson & Lione

(57) ABSTRACT

A method of conveying an email message by receiving an email message from its sender, the email message including an address field in which an account name portion of the address field is a descriptor of the intended recipient of the email message and which is different from a correct account name of the intended recipient, wherein the descriptor being a combination of one or more identifying elements associated with the intended recipient. The method further includes locating in a database of descriptors and email addresses the email address associated with the descriptor and forwarding the message to the email address yielded by the database.

49 Claims, 5 Drawing Sheets

OTHER PUBLICATIONS

Derwent Abstract Accession No. 98-256828, published by Derwent Abstracts, regarding Japanese published application 10-083362, published Mar. 31, 1998.

C. Weider et al., "Technical Overview of Directory Services Using the X.500 Protocol," published by Network Working Group, published 1992, seventeen pages.

English language Abstract of Japanese publication 08-97853, publisher unknown, it is believed that the English language Abstract was published prior to May 10, 2001, one page.

English language Abstract of Japanese publication 10-083362, publisher unknown, it is believed that the English language Abstract was published prior to May 10, 2001, one page.

Translation of Japanese publication 08-097853.

W. Hilal et al., "Designing Large Electronic Mail Systems", 1998 International Conference on Distributed Computing Systems held in San Jose, CA IEEE Comput. Soc. Pr., 1988, pp. 402-409.

* cited by examiner

SYSTEM FOR HANDLING ELECTRONIC MAIL

BACKGROUND OF THE INVENTION

1. Field of the Invention

This invention relates to systems for addressing and conveying electronic mail messages and refers particularly, though not exclusively, to a system which has an easier and more logical determination of email addresses and, further, which is capable of handling and possibly delivering normally undeliverable electronic mail messages.

DEFINITIONS

Throughout this specification a reference to the internet is to be taken as including a reference to the world wide web.

2. Description of the Related Art

In recent years communication by email has become commonplace. Email, a contraction of the words "electronic mail", refers to systems which allow messages to be sent between sites connected by data links. The most popular email system is based on the internet, a worldwide network of interconnected computer networks. Any user connected to the internet can send email to any other user. Internet users use email-client software which connects them via a telephone line and a modem to a gateway into the internet. The email client sends the message via the internet to a mail server. A mail server is a computer connected to the internet and equipped to receive, store and forward or deliver email messages. If person A wishes to send an email to person B, person A enters the message into his computer, which then sends the message data to a mail server via the internet. Person B then instructs his computer to check whether the mail server has any messages for him, and when such a message is found, the mail server sends the data to his computer, where person B can access it.

The same principles apply to email systems which do not connect to the internet, for example, many corporations use email within their enterprise, in which case it is transmitted via their intranet.

Email messages are typically structured according to a protocol known as SMTP (Simple Mail Transfer Protocol) which includes specification of an addressing format that enables email messages to be routed or directly delivered to the correct destination SMTP server. The address forms part of each email's header information. The usual address structure is "accountname@hostname" where "accountname" is the name of the user to whom the email is destined to be delivered; and "hostname" is the name of the host computer where the user has an account. "Hostname" generally comprises a hierarchical series of domain names, separated by periods. For example, "inform.com.au" is the name of the host computer named "inform" in the "com" (commercial) domain within the "au" (Australian) domain.

The "accountname" is typically an arbitrary alpha-numeric string chosen by the user. For example, "the boss@inform.com.au" could be the email address for an individual person at "inform", yet that person might not be named "boss", but could be the boss, or owner, of the business.

As evidenced by the foregoing example, there is not necessarily any obvious correlation between the email address and the name of the actual account holder, as no standards have been established to regularise this aspect of the SMTP protocol. Consequentially, a person wishing to send an email to a person called John Smith at a business known as Informatel, but who does not know his email address, might guess that the address is "john_smith@informatel.com.au; johnsmith@ informatel-.com.au; or "jsmith@informatel.com.au", or any number of similar permutations.

If the email address is incorrect, it is common practice for the mail server to "bounce" the email—that is, to return it to the sender along with a message explaining the reason the message could not be delivered. The most common reasons for delivery failure are that the "hostname" specified in the address field could not be not found, for example because of a spelling error; or that the user name specified in the address field did not correspond to any user registered with the host specified.

In an effort to provide a means of discovering correct email addresses, numerous directory databases have been established, whereby a person's or corporation's email address can be searched for based on key indicators such as name, address, telephone number, geographical location, and so forth. Such directories have only partly solved the problem of obtaining email addresses as they are not comprehensive. They are also inconvenient to use because the person sending the email must access a directory and search for the desired email address as an extra step in the process of sending an email.

It is therefore an object of the present invention to provide an improved system for addressing and conveying email messages which addresses some of the limitations of the prior-art addressing and conveying schemes, and allows the sender of an email to use certain well-known descriptors of the intended addressee as an alternative to the addressee's actual account and domain names.

A further object of the present invention is to provide an improved system for dealing with undeliverable email messages by attempting to discern the likely correct email address based on the incorrect one supplied.

SUMMARY OF THE INVENTION

According to a first aspect of the present invention, there is provided a method of conveying an email message including an address field in which an account name portion of the address is a descriptor of the intended recipient of the message and which may be different from the account name of the intended recipient, including the steps of locating in a database of descriptors and email addresses the email address associated with the descriptor, and transmitting the message to the email address yielded by the database.

According to a further aspect of the present invention, there is provided a system handling undeliverable electronic mail, including the steps of receiving an email message including an invalid destination address, searching a database for records partially or completely matching parts of the destination address and, if a prescribed threshold of match is exceeded, forwarding the email message to a valid email address retrieved from the database according to the result of said search.

According to another aspect of the present invention, there is provided a method of conveying an email message including the steps of receiving an email message forwarded by a sender, the email message including an invalid destination address, searching a database for records partially or completely matching parts of the destination address, and sending a notification message to the sender of the email message, the notification message advising the sender of the results of the database search.

The invention also provides a method of conveying an email message including the steps of receiving the email message from its sender, the email message including an address field in which an account name portion of the address is a descriptor of the intended recipient of the message and which may be different from the account name of the intended recipient, locating in a database of descriptors and email addresses the email address associated with the descriptor, and transmitting the message to the email address yielded by the database.

Preferably, the database includes fields corresponding to commonly-used identifiers such as a telephone number, business name, street address, or personal name.

Preferably, the descriptor is a telephone number associated with the intended recipient. Alternatively, the descriptor may be a business name associated with the intended recipient. Further alternatively, the descriptor may be a personal name associated the intended recipient.

Furthermore, the descriptor may be a part of a street address associated with the intended recipient.

The descriptor may also be a combination of one or more identifying elements associated with the intended recipient. For example, the descriptor may comprise a concatenation of a name and city, such as 'johnsmithsydney' or, for greater clarity, 'johnsmith.sydney'. This extension of the inventive concept can be useful for differentiating between several people with the same name. The descriptor may also include a concatenation of name and telephone number, such as johnsmith.61266525689. This, again, is helpful in differentiating between multiple people with the same name, or in cases where there are a number of individual person's email address associated with the one telephone number. It is envisaged that the invention would be arranged so that a great variety of combinations of descriptors can be used in a flexible arrangement. A consequence of this is that the more information included in the descriptor, the less likely for there to be ambiguity or uncertainty.

The present invention may provide a method of generating and conveying a return email notification to the sender of the email message, which reports the status of the database search and whether or not the email has been forwarded. Preferably it will also report when the email message has been received and/or read. This may also include notification to the recipient of the email that a message has been received. The notification may include notification by internet, telephone, facsimile, pager or satellite, and may include the forwarding of the email message. The recipient may be able to select or specify if they are to be notified, and/or if the message is to be forwarded. Status messages may include notification of failure to match the descriptor with an email address, reporting of the email address or addresses found, and other status information which may be of interest to the person creating the email message.

The present invention may also provide a method of generating a notification to an unregistered sender and/or recipient of an email message to encourage them to register with the system of the present invention. The notification may include information on the advantages of the system and/or a registration request. Preferably, the notification will be sent to a particular address no more than a prescribed number of times in a given period.

An advice of the action taken may also be sent to a registered user whose email message (either as sender or receiver) was the cause of the notice to be sent to the unregistered user.

The invention also includes means for carrying out the method of conveying email messages described in the preceding paragraphs.

Another embodiment of the invention is that especially formatted email messages are interpreted as database queries and not as email messages to be readdressed and forwarded. According to one aspect, for example, a person wishing to ascertain the email address of John Smith can send an email addressed to johnsmith@invention.com with the keyword "find" (for example) as the text of the message, and an email will be returned to the inquirer reporting the results of the search of the database. The johnsmith component may be expressed in different ways, such as, for example jsmith, smithj, john.smith or john-smith.

In another aspect, the present invention includes a computer equipped with email client software adapted to execute the steps of recognising that an email address of a message being sent does not include a host name, for example by the absence of the @ symbol, and appending a predetermined hostname to the address before sending the email. According to this aspect, use of the email by the sender is beneficially simplified as the sender of the email needs enter only the descriptor information into the email client's address field, after which the email sender adds the host name of the server adapted to perform the steps of the present invention. For example, the email sender enters an address of johnsmith in the address field of the email client and selects "send". The client then appends @invention.com to form the address johnsmith@invention.com, and sends it to that host. The host invention.com then looks up the database, finds that johnsmith is, for example, techsup@megabig.com.nl and forwards the email to that address.

In an alternative form, the terminal or client (the "terminal") of the sender may recognise that the address of the message being sent is not complete and/or correct. It therefore sends a message (by any suitable means, not necessarily email but including email) to the server which then searches the database for the complete/correct email address of the intended recipient. If the complete/correct address is not found, the sender's terminal is advised and the sender can make the appropriate decision as to what to do. If the complete/correct address is found it is forwarded to the sender's terminal which then inserts the correct/complete address in the email message and sends the message to the intended recipient. If more than one possible complete/correct address is found, the sender's terminal is advised and the sender can make the appropriate selection.

The invention also provides a method of determining an email address including providing a database where email addresses are linked with descriptors relevant for a person at each email address so that a user can provide one or more of the descriptors enabling a search to be conducted of the database to determine the relevant email address, the descriptors including at least one of given name, surname, address, domain name, name of business, and/or telephone number(s).

The database may be at the server, or separate. If separate, the server would recognise that the information given in the account name portion of the address was insufficient or not in the correct form for delivery, and therefore pass the necessary message to the operator of the database who would locate the correct or complete address, and forward the message. Alternatively, the operator of the database could pass the correct or complete address back to the server to enable them to send the message.

The invention also includes a database to enable the method to be performed, the database having fields for email addresses, and separate fields for each of, for example, given name, surname, telephone number, domain name, name of business and/or address; at least one of the separate fields being completed for each email address.

The invention also provides an address system to enable users of computer-based telecommunication systems to independently locate an address of a user, the address system including at least one portion which is the numeric characters of a number of a telecommunications device of the user, the at least one portion being that portion which identifies the user. The telephone number may include the area code within the user's country, or may include the country code within the user's country; or may include the personal access number within the user's country.

Preferably, the computer-based telecommunication system is the internet.

The device may be a telephone, facsimile, pager, mobile telephone or satellite connected technology.

At least one portion of the descriptor may be alpha numeric; with the alpha optionally including at least a part of a name of the user.

The alpha may precede the numeric, or the numeric may precede the alpha.

The present invention may also include an enquiry facility which will allow the sender of the proposed email to ascertain the details of the recipient's universal messaging contact details. These contact details may include the prospective recipient's street address, telephone number, facsimile number, mobile telephone number, email address, domain name, pager, or satellite connected details or any other email address information he or she chooses to make available.

DESCRIPTION OF THE DRAWINGS

Preferred embodiments of the present invention will now be described by way of non-limitative example only with reference to the accompanying illustrative drawings, in which.

DESCRIPTION OF PREFERRED EMBODIMENTS

Figure 1:
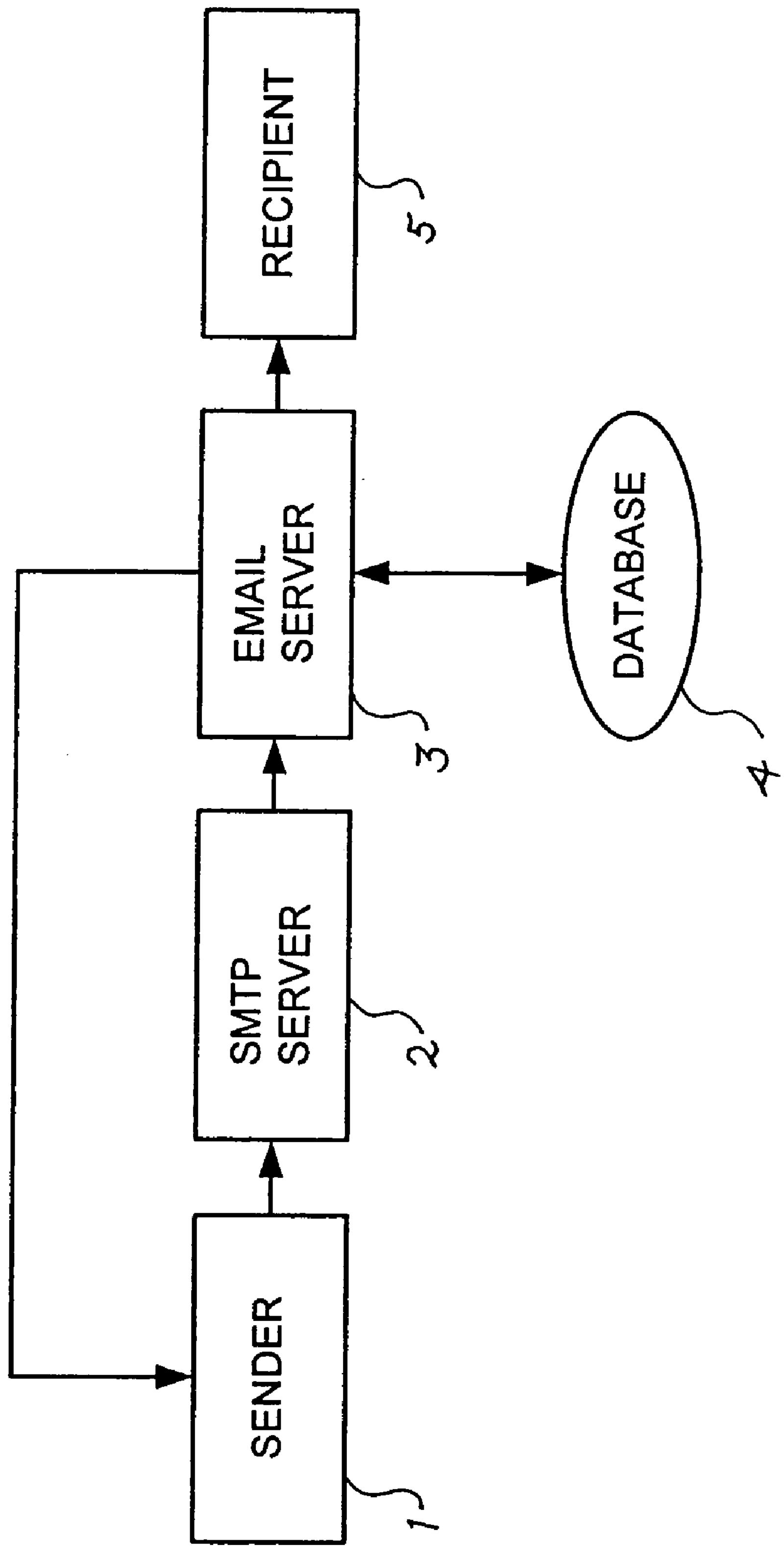
FIG. 1 is a block diagram showing the various functional units of a first Embodiment.

Referring to FIG. 1, sender 1 is a standard email client, complying with SMTP, sending an email intended for delivery to recipient 5. The author of the email using sender 1 composes an email message and sends it to SMTP server 2. When SMTP server 2 attempts to send the message to recipient 5, in the conventional manner, the message will not be deliverable if the address is invalid. For example, the author might have used the address: "john.jones@mega.com" when in fact there is no such user registered with the host: "mega.com". The correct address for John Jones could be: "jjones@mega.com". Alternatively, the author may have omitted the hostname altogether, resulting in an address considered invalid by SMTP server 2.

Having determined that the message is undeliverable, SMTP server 2 then forwards the message to undeliverable email server 3. Undeliverable email server 3 includes a database including records which relate keywords to valid email addresses. Such keywords might include a person's name, business name, telephone number, street address, or any other identifying information that helps identify the person. On receipt of the undeliverable email, undeliverable email server 3 uses substrings of the email address as keywords in an attempt to match a record in database 4.

In this preferred embodiment of the invention, the software is arranged so that if all substrings of the user name part of the email address, delimited by non-alphanumeric characters, match the keywords in full or in part of a database record, the email is forwarded to the email address retrieved from that database record. Continuing the example above where the email was addressed to: "john.jones@mega.com", the database lookup using "john" and "jones" as keywords finds a record for John Jones, including the correct email address, namely: "jjones@mega.com".

If the database lookup is ambiguous, that is there is more than one record including the keywords "john" and "jones", undeliverable email server 3 sends a message back to the author explaining that the original address used was invalid, and reporting the several "john jones" records found, so that the author can select the correct address. When the correct one of several possibilities has been selected, the author completes the address and forwards the email message; or returns the message to undeliverable email server 3 which then forwards it to the desired recipient.

The database lookup function in the embodiment of the invention described in relation to FIG. 1 is normally performed at the site of undeliverable email server 3. However, this function could be provided by a database server located elsewhere.

Furthermore, database 4 may well, in practice, not be located at one site but may be distributed over multiple sites. For example, if server 3 receives an email addressed with a descriptor including the word "japan", a database query could be sent to a suitable database server in Japan. Similarly, if undeliverable email server 3 were to receive an email addressed to a phone number starting with, for example, "49", it could either send a query to the telephone number database in Germany, or it could forward the whole message to a suitable server in Germany for further handling.

Figure 2:
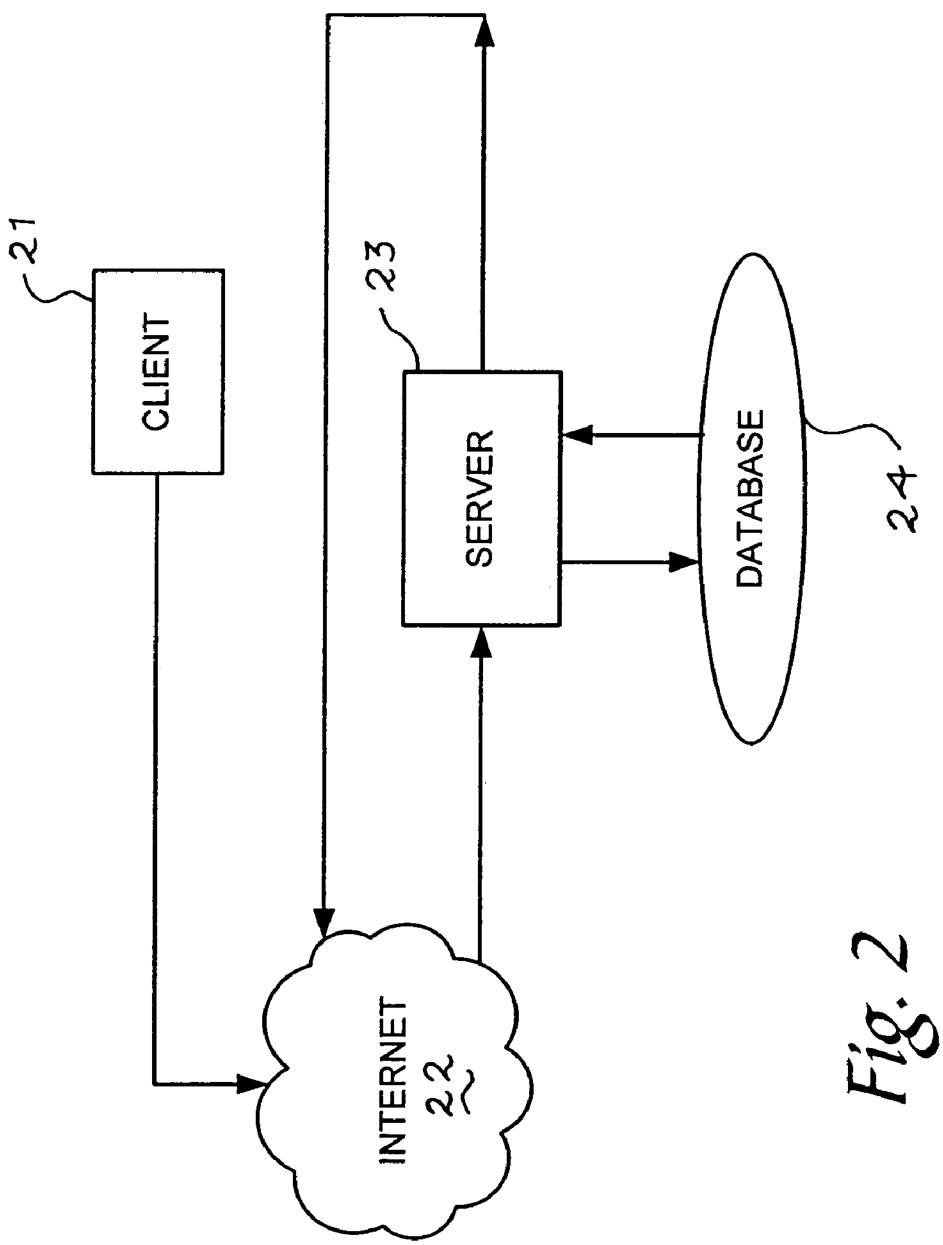
FIG. 2 is a block diagram showing the various functional units of a second Embodiment.

Referring to FIG. 2 where similar components have similar reference numerals with a prefix number 2, email client 21 is a standard email client complying with SMTP. The author of the email message in this example does not know the address of the person he wishes to send it to, but does know the person's telephone number 6193312345 which, including the country code, 61 in this example, is unique to that person. The author therefore addresses the message to 6193312345@phoneserv.net, phoneserv.net being the host name of the special server of this exemplary embodiment of the present invention.

E-mail client 21 then sends the SMTP message addressed to 6193312345@phoneserv.net to internet 22 via a suitable router. The message is subsequently routed to server 23 which is running on the host called phoneserv.net. Server 23 is adapted to access database 24 which is a database mapping email addresses to descriptors, including, in this example, personal name, business name, street address, and telephone number. In this example, a search of the entries for telephone number 6193312345 returns the email address xyz@domain.com. Server 23 then substitutes the address xyz@domain.com for the received address of 6193312345@phoneserv.net and sends the message with this address onwards via the Internet to the desired destination.

To further enhance the usefulness of this embodiment of the invention, the software is arranged so that multiple keywords and/or fields can be combined within the descriptor of the address. For example, a database lookup of the descriptor johnsmith may return many matches. To narrow the search, part or whole of his address can be added to the descriptor. For example, if the sender knows that John Smith lives in Centennial Street, Bankstown, he could use the descriptor johnsmith.bankstown or preferably johnsmith.centennial.bankstown. The latter would probably return a unique database match. The database engine of this embodiment of the invention applies well-known software techniques to allow free-form matching of multiple keys within descriptors.

It is envisaged that where possible the telephone number of the addressee would be used as the descriptor. By including the country code and/or area code in the telephone number, such a descriptor is likely to uniquely specify the desired addressee. Furthermore, telephone numbers can be readily ascertained, for example from directory assistance services or telephone directories. Where several people may be associated with one telephone number, for example several employees of a business or several residents at one home, further qualification can be added to the descriptor. For example, the person's given name or names can be included to form a descriptor such as john.61247515280. The database engine can be arranged so that if the search of the database gives returns a unique email address, any further qualification of the descriptor is ignored. In the example of john.61247515280, if 61247515280 returns a unique match, the prepended "john" is ignored.

In the case where no match is found or multiple matches result in ambiguity, server 23 returns a message to the sender explaining the nature of the problem which may include additional information on some or all of the matches. The sender might then try again using a different or expanded descriptor by for example:
johnsmith61247515280.

In an alternative in this embodiment of the invention, email client 21 is further adapted to automatically include a predetermined hostname if none is included in the address entered by the author of the email being sent. In other embodiments, server 23 is adapted to accept email addresses which do not include a hostname. These enhancements allow the user to enter only a descriptor, for example just a telephone number, the database then providing the server with the required, relevant information obtained from the database, and the server then converting this to the relevant email address.

Whereas the signalling connections of the exemplary embodiment of FIG. 1 are described as being discrete paths it will be understood that in practice these connections can advantageously be implemented as a network such as the Internet.

For the embodiment of FIG. 2, although the database search function in the embodiment of the invention described above is performed at the site of server 23, it will be understood that this function could be provided by a database server located elsewhere. Furthermore, the database may well, in practice, not be located at one site but be distributed over multiple sites. For example, if server 23 receives an email addressed with a descriptor including the word "japan" a database query could be sent to a suitable database server in Japan. Similarly, if server 23 were to receive an email addressed to a telephone number starting with, for example, "49", it could either send a query to the telephone number database in Germany, or it could forward the whole message to a suitable server in Germany for further handling.

The invention is also applicable to unifixed messaging systems whereby messages sent by one medium may be delivered by another. For example, by using voice-recognition technology, text-to-speech, speech-to-text recognition or keypad operation, a telephone message may be delivered by facsimile, internet or intranet, or by satellite; or an email message sent via the internet may be delivered to a mobile telephone, satellite, pager, facsimile, or the like.

It is also envisaged that part or all of the functionality of the invention could be provided by software running at the email sender's site. For example, an email client could be adapted to automatically send a search request to a remote database, substitute a returned email address for a descriptor entered by the author of the email, and then send the email to that address. It is of course also envisaged that part or all of the invention can be implemented as software running at an internet service provider's site.

In an alternative form, the terminal or client (the "terminal") of the sender may recognise that the address of the message being sent is not complete and/or correct. It therefore sends a message (by any suitable means, not necessarily email but including email) to the database server which then searches the database for the complete/correct email address of the intended recipient. If the complete/correct address is not found, the sender's terminal is advised and the sender can make the appropriate decision as to what to do. If the complete/correct address is found it is forwarded to the sender's terminal which then inserts the correct/complete address in the email message and sends the message to the intended recipient. If more than one possible complete/correct address is found, the sender's terminal is advised and the sender can make the appropriate selection.

This allows for security in that the sender will know that the email message will only be send if there is certainty. It also may allow a manual override in that the decision to send the email message is up to the sender. Furthermore, the text of the message is not being held in the database or search engine during the processing, it is being held at the sender's terminal.

If a number possible complete/correct addresses are found, the selection of one by the sender may cause the selected address to be inserted in the email message "To:" field and for it to be sent.

Also, when the database search/request is sent by the sender's terminal it may specify a degree of certainty (eg. 80%) so that when the database is searched it will select only those possible addresses where the degree of certainty of a correct match is the same as or greater than that specified.

Figure 3:
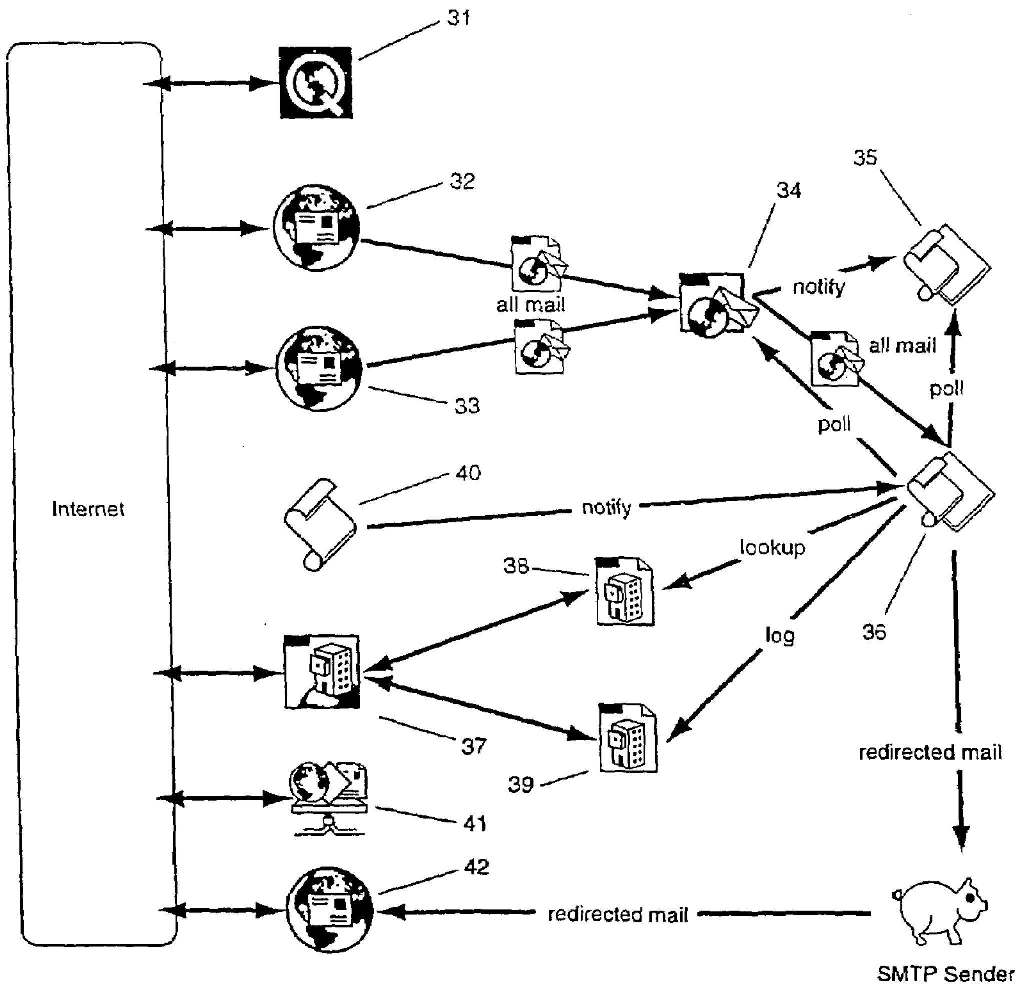
FIG. 3 is a representation of one example.
Figure 4:
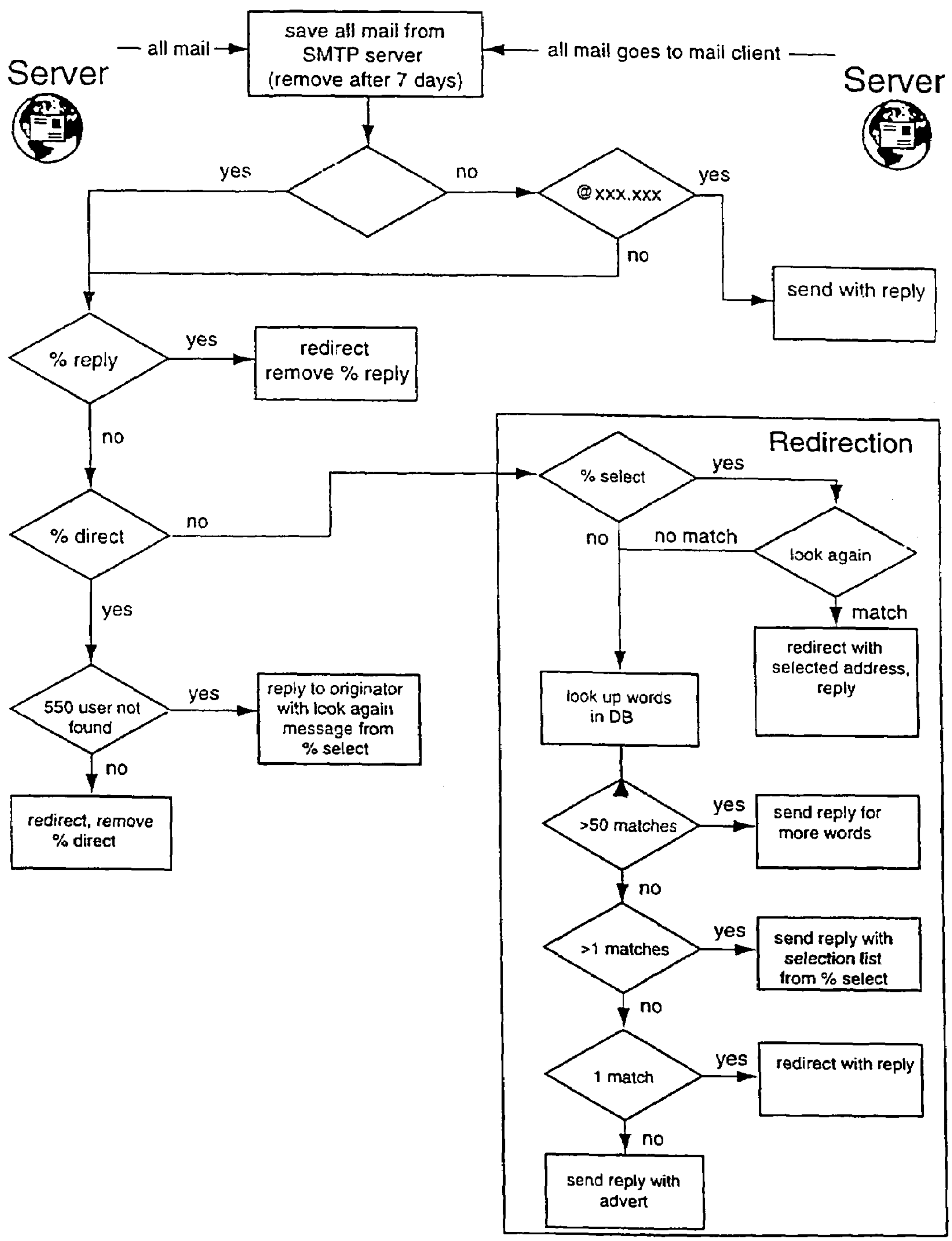
FIG. 4 is a flow chart for the example of FIG. 3.

The example of FIGS. 3 and 4 accepts mail in a number of formats, using the mail address provided as keywords to search a database of people and their real email addresses. Various modules of the system run on a number of servers.

The domain name server 31 translates the various names into IP addresses. It also defines the mail servers. The first mail server 32 receives and stores all mail for the system of the present invention. It is programmed to store all mail into a single account.

The mail "client" 34 allows the system of the present invention to take control of the client for such activities as fetching and replying to mail. It is set to fetch mail, for example, every two minutes. When new mail arrives, the client sets a flag in the flag application 35 to show that mail needs to be processed.

The client is set up with multiple mail "accounts", each of which has its own "From:" address. These accounts are used when replying to mail to tag different categories of mail, so the "From:" address and "Reply To:" address sent in reply can be used to select an appropriate response when a customer replies to them. For example, all messages sent to customers, which ask them to select from a list of possible matches, has the "From:" address of "x % select@invention.com", All mail messages are stored in the client, being moved out of the "in" folder into the folder appropriate to the message, eg messages that have no match in the people database 38 are stored in the "no match" folder for future re-matches.

The flag application 35 stores a status flag that mail is ready for processing. This application is separate from the system of the present invention to avoid deadlocks that might occur when the system of the present invention tries to run a script in the mail client 34 while the other is trying to send a message to the find application 36, which contains the intelligence for the system of the present invention. It periodically polls the flag application 35 to see if mail is available. If the flag is set, it processes the mail one by one. The "To:" address of each mail item is used to determine the action required. The flowchart for this is illustrated in FIG. 4.

Items with no "To:" address are ignored. Delivery failures messages are returned to the original sender with an advertising message. Selection messages contain "% select@invention.com" in the "To:" address, and these are processed to extract and act on the selection.

Messages that are addressed to other servers are sent on unmodified, except the "return-Path:" is tagged to allow detection of delivery failure.

Other messages are treated as a request for the present invention database lookup function.

As well as the specified fields in the database, there is another calculated field which is a concatenation of all other fields (except "email") with spaces between them. This is the only field that is actually searched during a lookup. The algorithm for processing the "To:" address of messages to be processed as lookup requests is as follows:

Except in the instance of domain name, everything after the "@" or "%" may be ignored.

Everything other than letters or numbers is interpreted as a word break.

What remains is the list of keywords.

A search is performed to find all records which contain any of the keywords.

Every record found is then examined, and if the combined field for that record contains every keyword, that record is added to the match list.

If there is more than one match, a selection request is sent.

If there is no match, a request for more keywords is sent.

If there is one match, the mail is redirected to the appropriate address.

The database and web server 37 has a built-in web server. The web server allows the administrator to edit the people database 38 and view the mail log 39, with appropriate access security. It also allows customers to add their details via the web, but not to edit them once they are added.

The people database 38 has a script 40 that is run when it is edited, which sets a flag in the application. This causes it to re-search the database for every mail item in its "no match" folder, so that customers can add their details to the database after mail addressed to them is received, and have the mail correctly delivered. Mail items in the "no match" folder may be held there indefinitely, or for a defined period of time.

The people database 38 stores all information about the people. As well as the defined fields, it also has a calculated "combined" field, which is a combination of all fields except the email address. This combined field is used for keyword searches. Some of the fields have input checking: the telephone fields must be numeric only (so that searches based on telephone numbers work) and the email field is mandatory.

It may be necessary to tag the "Reply-To:" address of email messages so that undeliverable mail could be trapped and acted on appropriately. A simple TCP/IP application may be used to send messages.

For all embodiments, if the server located an excessive number (which may be a defined number) of potential matches for the complete/connect address it may raise a query with the sender requesting further information on the proposed recipient to enable the number of potential matches to be reduced. For example, if the sender has supplied the keywords "john.smith.richmond" with there being a large number of cities in the world named "Richmond", the number of potential matches would be quite high. Therefore the server could request more information such as, for example, a way of designating which city of Richmond is relevant. This may be by providing country and state details, or by providing the country and/or state and/or distinct telephone codes.

Figure 5:
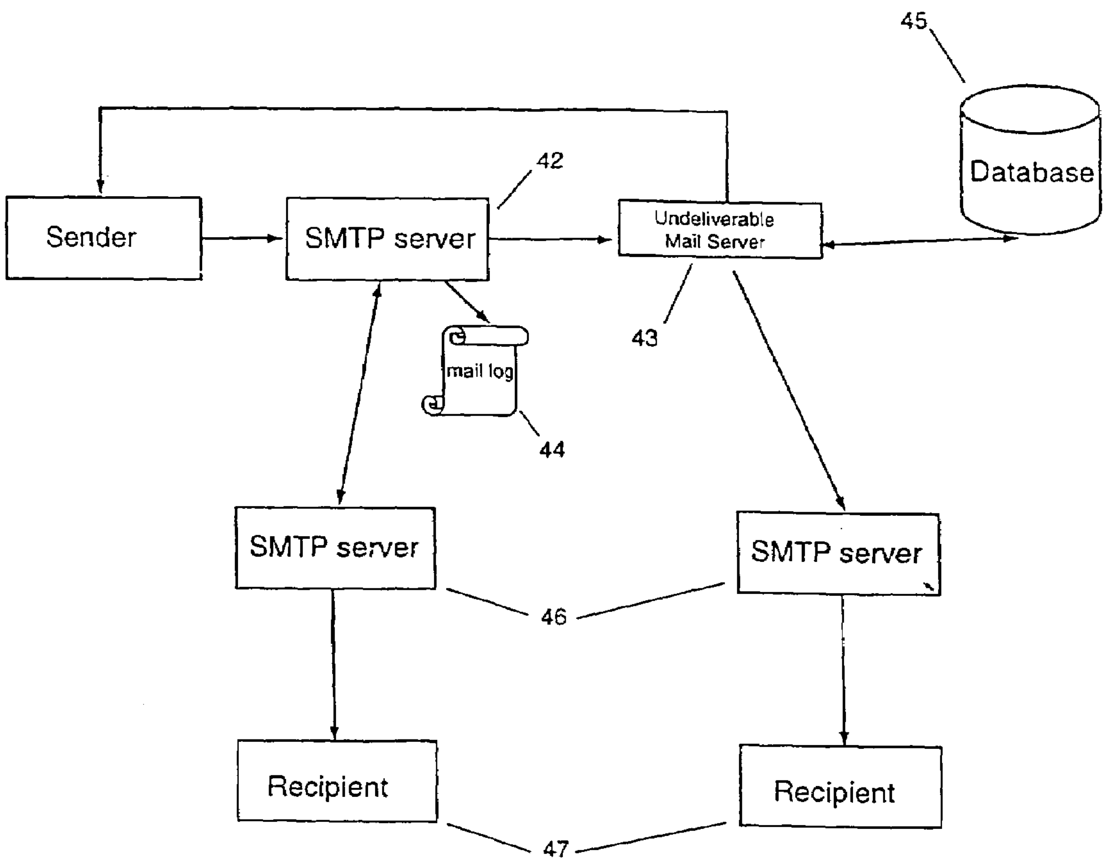
FIG. 5 is a flow chart for a further embodiment.

To now refer to FIG. 5, an additional function may be included in the present invention to enable automatic notification/information to be sent by email to people who may be interested in registering with the system and having the relevant information in the database. The criteria for a person to be sent this notification/information email is based on email messages they have sent to or received from, a person registered to use the present invention and thus whose information is on the database. If, for instance, a particular registered user sends an email to a non-registered user, the system will identify the non-registered user and automatically send an email message to that person informing them of the system and its benefits. Also included in the email message will be mention of the registered user name or at least the email address of the person, who either recently sent them an email message or being a person to whom they recently sent an email message.

The automatic email message generated will be received shortly after the user receives the original email that triggered its creation.

There are many possible mechanisms for implementing this additional functionality. One method involves additional configuration at the participating ISP's site, along with an upgrade in functions of the database search engine server. FIG. 5 shows diagrammatically the elements involved in this embodiment of the present invention. The ISP's SMTP server 42 is configured to forward undelivered mail to the mail server 43. The server 43 attempts to resolve the correct recipient address through the information contained in the original TO: address field. If it is successful, the server 43 contacts the recipients ISP (SMTP server) 46 and forward the email, the recipient 47 typically receives the email via a connection between his email client and the ISP's POP/IMAP server. The additional configuration required for the server 42 involves the periodic delivery of an extract of the mail log on the ISP's SMTP server 42 to the mail server 43. The mail log 44 typically contains detailed information about all mail sent and received by the mail server 42. An extract of this mail log 44 is generated to include the destination address and sender address pairs for every email that has passed through the server since the last time the extract was created (multiple instances of the same pair would be removed). The extract is then sent to the mail server 43 where it is processed. Processing involves querying the database 45 for the existence of each and every address in the mail log extract. If the address being queried is not found to exist in the database 45 (signifying an unregistered user), the system generates a notification/information email for delivery to the unregistered person who had previously received from or sent an email to the registered user. That notification email outlines the benefits of the system, advise of the person they have received or sent an email message to or from a registered user, and invite them to register. To avoid unregistered users repeatedly receiving information on the system and an invitation to register, the database 45 and query engine may be suitably equipped to determine how many email messages have been sent to a particular unregistered user, and to cease sending the email messages when a defined limit is reached. This may be an open ended feature, or one whereby after a prescribed period the unregistered user may again receive information on the system. Also the auto-mailer feature should be optional for each registered user. That is, if a registered user doesn't want the system contacting recipients with the notification email message then the registered user should be able to switch this feature on/off. The information forwarded to the unregistered user may include the name/contact details of the registered user whose email triggered the sending of the information.

The descriptor for any one registered user may be changed by that user from time to time via the worldwide web, email, telephone, mail, or as otherwise allowed.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention may be embodied in other forms that those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A method of conveying an email message including an address field containing a descriptor of an intended recipient of the email message, the descriptor being different from an email account name of the intended recipient, the method comprising:

sending a database query to a database containing a plurality of identifying elements associated with the intended recipient and email addresses to search for the email address associated with the descriptor, wherein said descriptor comprises at least one of the identifying elements; and transmitting said email message to said email address found during said search of the email addresses if a unique email address is located.

2. The method of claim 1, wherein said descriptor includes one or more identifying elements selected from a list including a telephone number associated with said intended recipient, a business name associated with said intended recipient, a personal name associated with said intended recipient, and a part of a street address associated with said intended recipient.

3. The method of claim 1, wherein said descriptor includes a concatenation of a name and city.

4. The method of claim 1, wherein said descriptor includes a concatenation of name and telephone number.

5. The method of claim 1, further comprising:

generating and conveying a return email notification to the sender of said email message.

6. The method of claim 5, wherein said return email notification reports the status of said database search and whether or not said email message has been received.

7. The method of claim 6, wherein said return email notification also reports when said email message has been received.

8. The method of claim 6, wherein said return email notification includes notification of a failure to match said descriptor with an email address located within said database.

9. The method of claim 5, wherein said return email notification includes notification of a failure to match said descriptor with an email address located within said database.

10. The method of claim 1, wherein especially formatted email messages are interpreted as database queries, and not as email messages to be readdressed and forwarded.

11. The method of claim 1, wherein said database comprises fields for email addresses, and separate fields for each of given name, surname, telephone number, name of business and/or address; at least one of the separate fields being completed for each email address.

12. A method for handling undeliverable electronic mail, comprising:

receiving an email message including an invalid destination address that includes a descriptor;

sending a database query to a database, which includes a plurality of identifying elements associated with said invalid destination address, to search for records partially or completely matching parts of said invalid destination address, wherein said descriptor comprises at least one of said plurality of identifying elements; and forwarding said email message to a valid unique email address retrieved from said database according to the result of said search for records.

13. The method of claim 12, wherein said descriptor is selected from a list including a telephone number associated with said intended recipient, a business name associated with said intended recipient, a personal name associated with said intended recipient, and a part of a street address associated with said intended recipient.

14. The method of claim 12, wherein said descriptor includes a concatenation of a name and city.

15. The method of claim 12, wherein said descriptor includes a concatenation of name and telephone number.

16. The method of claim 12, further comprising:

generating and conveying a return email notification to the sender of said email message.

17. The method of claim 16, wherein said return email notification reports the status of said database search and whether or not the email message has been received.

18. The method of claim 17, wherein said return email notification also reports when said email message has been received.

19. The method of claim 17, wherein said return email notification includes notification of failure to match said descriptor with an email address located within said database.

20. The method of claim 16, wherein said return email notification includes notification of failure to match said descriptor with an email address located within said database.

21. The method of claim 12, wherein especially formatted email messages are interpreted as database queries, and not as email messages to be readdressed and forwarded.

22. The method of claim 12, wherein said database comprises fields for email addresses, and separate fields for each of given name, surname, telephone number, name of business and/or address; at least one of the separate fields being completed for each email address.

23. A method for conveying an email message comprising:

receiving an email address forwarded by a sender, said email message including an invalid destination address that includes a descriptor;

sending a database query to a database, which includes a plurality of identifying elements associated with said invalid destination address, to search for records partially or completely matching parts of said invalid destination address, wherein said descriptor comprises at least one of said plurality of identifying elements; and sending a notification message to the sender of the results of said database search.

24. The method of claim 23, wherein said descriptor is selected from a list including a telephone number associated with said intended recipient, a business name associated with said intended recipient, a personal name associated with said intended recipient, and a part of a street address associated with said intended recipient.

25. The method of claim 23, wherein said descriptor includes a concatenation of a name and city.

26. The method of claim 23, wherein said descriptor includes a concatenation of name and telephone number.

27. The method of claim 23, further comprising:

generating and conveying a return email notification to the sender of the email message.

28. The method of claim 27, wherein said return email notification reports the status of said database search and whether or not the email message has been received.

29. The method of claim 28, wherein said return email notification also reports when said email message has been received.

30. The method of claim 28, wherein said return email notification includes notification of failure to match said descriptor with a record located within said database.

31. The method of claim 27, wherein said return email notification includes notification of failure to match said descriptor with a record located within said database.

32. The method of claim 23, wherein especially formatted email messages are interpreted as database queries, and not as email messages to be readdressed and forwarded.

33. The method of claim 23, wherein said database comprises fields for email addresses, and separate fields for each of given name, surname, telephone number, name of business and/or address; at least one of the separate fields being completed for each email address.

34. A method of conveying an email message comprising:

receiving an email message from its sender, said email message including an address field containing a descriptor of the intended recipient of said email message and which is different from an email account name of said intended recipient, the descriptor being selected from a plurality of identifying elements associated with the intended recipient;

sending a database query to a database, which contains a plurality of identifying elements for a plurality of recipients and email addresses to locate a unique email address associated with said descriptor; and forwarding the message to the email address yielded by the database.

35. The method of claim 34, wherein said descriptor is selected from a list including a telephone number associated with said intended recipient, a business name associated with said intended recipient, a personal name associated with said intended recipient, and a part of a street address associated with said intended recipient.

36. The method of claim 34, wherein said descriptor includes a concatenation of a name and city.

37. The method of claim 34, wherein said descriptor includes a concatenation of name and telephone number.

38. The method of claim 34, further comprising:

generating and conveying a return email notification to the sender of the email message.

39. The method of claim 38, wherein said return email notification reports the status of said database search and whether or not the email message has been received.

40. The method of claim 39, wherein said return email notification also reports when said email message has been received.

41. The method of claim 39, wherein said return email notification includes notification of failure to match said descriptor with an email address located within said database.

42. The method of claim 38, wherein said return email notification includes notification of failure to match said descriptor with an email address located within said database.

43. The method of claim 34, wherein especially formatted email messages are interpreted as database queries, and not as email messages to be readdressed and forwarded.

44. The method of claim 38, wherein said database comprises fields for email addresses, and separate fields for each of given name, surname, telephone number, name of business and/or address; at least one of the separate fields being completed for each email address.

45. A method of determining an email address comprising:

maintaining a database where email address are linked with a plurality of identifying elements relevant for a person at each email address so that a user can provide one or more of the identifying elements;

wherein upon recognition by a server that information in an address field of the email address is insufficient or not in the correct form of delivery, a search is conducted of the database to determine a relevant email address, the plurality of identifying elements including at least one of a given name, surname, address, name of business, and/or telephone number of said person.

46. The method of claim 45, wherein the database is at said server.

47. The method of claim 45, wherein the database is separate from said server.

48. The method of claim 45, wherein said correct or complete email address is passed from the database back to the server to enable it to send said necessary message.

49. The method of claim 45, wherein said database comprises fields for email addresses, and separate fields for each of given name, surname, telephone number, name of business and/or address; at least one of the separate fields being completed for each email address.

* * * * *